United States Patent
Player et al.

(10) Patent No.: US 6,912,667 B1
(45) Date of Patent: Jun. 28, 2005

(54) SYSTEM AND METHOD FOR COMMUNICATING FAULT TYPE AND FAULT LOCATION MESSAGES

(75) Inventors: Andrew Mark Player, Salem, NH (US); Eric Minghorng Su, Tustin, CA (US)

(73) Assignee: Applied Micro Circuits Corporation, San Diego, CA (US)

( * ) Notice: Subject to any disclaimer, the term of this patent is extended or adjusted under 35 U.S.C. 154(b) by 580 days.

(21) Appl. No.: 10/094,247

(22) Filed: Mar. 8, 2002

(51) Int. Cl.[7] ................................................ G06F 11/10
(52) U.S. Cl. .............................. 714/4; 714/746; 710/30; 370/471; 398/10
(58) Field of Search ............................. 714/57; 710/30; 370/471, 473–6, 464–5, 907; 398/1, 10

(56) References Cited

U.S. PATENT DOCUMENTS

| | | | | |
|---|---|---|---|---|
| 4,970,714 A | * | 11/1990 | Chen et al. | 370/216 |
| 5,130,980 A | * | 7/1992 | Kobayashi | 370/535 |
| 5,151,902 A | * | 9/1992 | Grallert | 714/704 |
| 5,307,353 A | * | 4/1994 | Yamashita et al. | 714/4 |
| 5,422,893 A | * | 6/1995 | Gregg et al. | 714/748 |
| 5,636,203 A | * | 6/1997 | Shah | 370/244 |
| 6,145,024 A | * | 11/2000 | Maezawa et al. | 710/14 |
| 6,298,398 B1 | * | 10/2001 | Elliott et al. | 710/30 |
| 6,310,884 B1 | * | 10/2001 | Odenwald, Jr. | 370/412 |
| 2004/0008988 A1 | * | 1/2004 | Gerstal et al. | 398/45 |

* cited by examiner

*Primary Examiner*—Dieu-Minh Le
*Assistant Examiner*—Philip Guyton
(74) *Attorney, Agent, or Firm*—Law Office of Gerald Maliszewski; Gerald Maliszewski

(57) ABSTRACT

A system and method are provided for transporting FTFL messages in a G.709 network-connected simplex device. The method comprises: receiving messages from a first source in a digital wrapper frame format with overhead bytes in every frame; recovering FTFL information from the received message overhead bytes; and, selectively supplying modified FTFL information for transmit message overhead bytes to the first source. Recovering FTFL information from the received message overhead bytes includes recovering a 256 byte FTFL message, including a 128-byte forward message and a 128-byte backward message. Selectively supplying modified FTFL information for transmit message overhead bytes to the first source includes the substeps of: examining the received messages to determine errors; generating a backward message to report the determined errors; overwriting the received backward message with the generated backward message to create the modified FTFL information; and, in response to overwriting the received backward message with the generated backward message, sending a FTFL_status_out signal. Then, the method further comprises: transmitting messages to the first source with the modified FTFL information in response to the FTFL_status_out signal.

33 Claims, 7 Drawing Sheets

SYSTEM AND METHOD FOR COMMUNICATING FAULT TYPE AND FAULT LOCATION MESSAGES

BACKGROUND OF THE INVENTION

1. Field of the Invention

This invention generally relates to digital wrapper format communications and, more particularly, to a system and method for transporting fault type and fault location (FTFL) messages between simplex devices in a network using a digital wrapper format.

2. Description of the Related Art

Digitally wrapped, or multidimensional frame structure communications generally describe information that is sent as a packet without overhead to control the communication process. The packet can also include forward error correction (FEC) to recover the payload if the communication is degraded. One example of such a communication is the synchronous optical network (SONET). Another example is the digital wrapper format often used in transporting SONET communications.

There are many framed communication protocols in use, depending on the service provider and the equipment being used. These differences in protocols can be arbitrary or supported by an underlying function. Frame synchronization and overhead placement are sometimes standardized by governing organizations such as the ITU-T. At the time of this writing, the ITU-T standard for the digital wrapper format is G.709.

Conventionally, the interface node must include two sets of equipment. A communication in the first protocol is received at the first set of equipment (processor). The message is unwrapped and the payload recovered. Synchronization protocols must be established between the equipment set and a second set of equipment (processor). The payload can then be received at the second equipment set and repackaged for transmission in a different protocol.

The G.709 FTFL message is a 256 byte structure that consists of 1 byte per frame for 256 consecutive frames. The 256-byte structure is divided into a 128-byte forward message and a 128-byte backward message. Upon detection of certain error conditions, the receiving device must generate a 128-byte message to be sent upstream. The receiving node examines the overhead field and all the received data bits in payload portion of the G.709 frame to determine if this error condition exists. Once the receiving node has determined that the error exists, it must then generate the 128-byte message and inject it into the data stream in the backward direction.

FIG. 1 is a schematic block diagram of a full-duplex processing node (prior art). When a G.709 compliant full-duplex processing node is built up from a single integrated circuit device, all the communication of the FTFL in the backward direction takes place within that integrated circuit. However, G.709 compliant full-duplex processing nodes can also be built up from two simplex devices, in which case it is no longer possible to communicate the backwards FTFL information within a single integrated circuit. For G.709 compliant systems built with two simplex integrated circuit devices, it is extremely difficult to transfer the FTFL information from the forward to the backward direction. Devices designed to receive a G.709 data stream do not normally need to access the received backward fields because they are used for performance monitoring statistics by the receiving integrated circuit, and are then discarded.

It would be advantageous if two simplex processors could be easily integrated to communication backward messages in a G.709 network.

It would be advantageous if two simplex devices could be integrated in such a way as to communicate the backwards messages in real-time.

It would be advantageous if two simplex devices could be integrated to communicate G.709 FTFL backward messages without complicated interfacing circuitry.

SUMMARY OF THE INVENTION

Devices designed to receive a G.709 data stream do not normally need to access the received backward fields because they are used for performance monitoring statistics by the receiving integrated circuit, and are then discarded. By overwriting the received backward fields in the dropped overhead data stream, a system can be built to transfer the backward information in real time with no intervention from user software, and without the loss of any needed information.

This invention builds upon an overhead drop architecture to facilitate real-time transport of backward information among simplex devices. Systems that are built to be compliant to G.709 must communicate certain error fields upstream in the network. These error fields are transmitted in the allocated backward fields in the overhead part of the datastream. These backward fields are processed by the receiving node of a receiver/transmitter pair to determine the condition of the link being used by the transmitter of the pair. The invention defines two external signals to facilitate the report capabilities of the received backward errors, specifically, Fault Type and Fault Location (FTFL) messages.

Accordingly, a method is provided for transporting FTFL messages in a G.709 network-connected simplex device. The method comprises: receiving messages from a first source in a digital wrapper frame format with overhead bytes in every frame; recovering FTFL information from the received message overhead bytes; and, selectively supplying modified FTFL information for transmit message overhead bytes to the first source.

As mentioned above, recovering FTFL information from the received message overhead bytes includes recovering a 256 byte FTFL message, including a 128-byte forward message and a 128-byte backward message. Selectively supplying modified FTFL information for transmit message overhead bytes to the first source includes the substeps of examining the received messages to determine errors; generating a backward message to report the determined errors; overwriting the received backward message with the generated backward message to create the modified FTFL information; and, in response to overwriting the received backward message with the generated backward message, sending a FTFL_status_out signal. Then, the method further comprises: transmitting messages to the first source with the modified FTFL information in response to the FTFL_status_out signal.

Overwriting the received backward message with the generated backward message to create modified FTFL information includes the substeps of dropping the overhead bytes in the received message; replacing the received FTFL information with the modified FTFL information; and, writing a buffer with the modified FTFL information using write timing signals responsive to the received messages. The FTFL_status_out signal is sent when the modified FTFL information has been buffered.

Additional details of the above-described method, and a system for transporting fault type and fault location (FTFL) messages in a G.709 network are provided below.

DETAILED DESCRIPTION OF THE PREFERRED EMBODIMENTS

Figure 1:
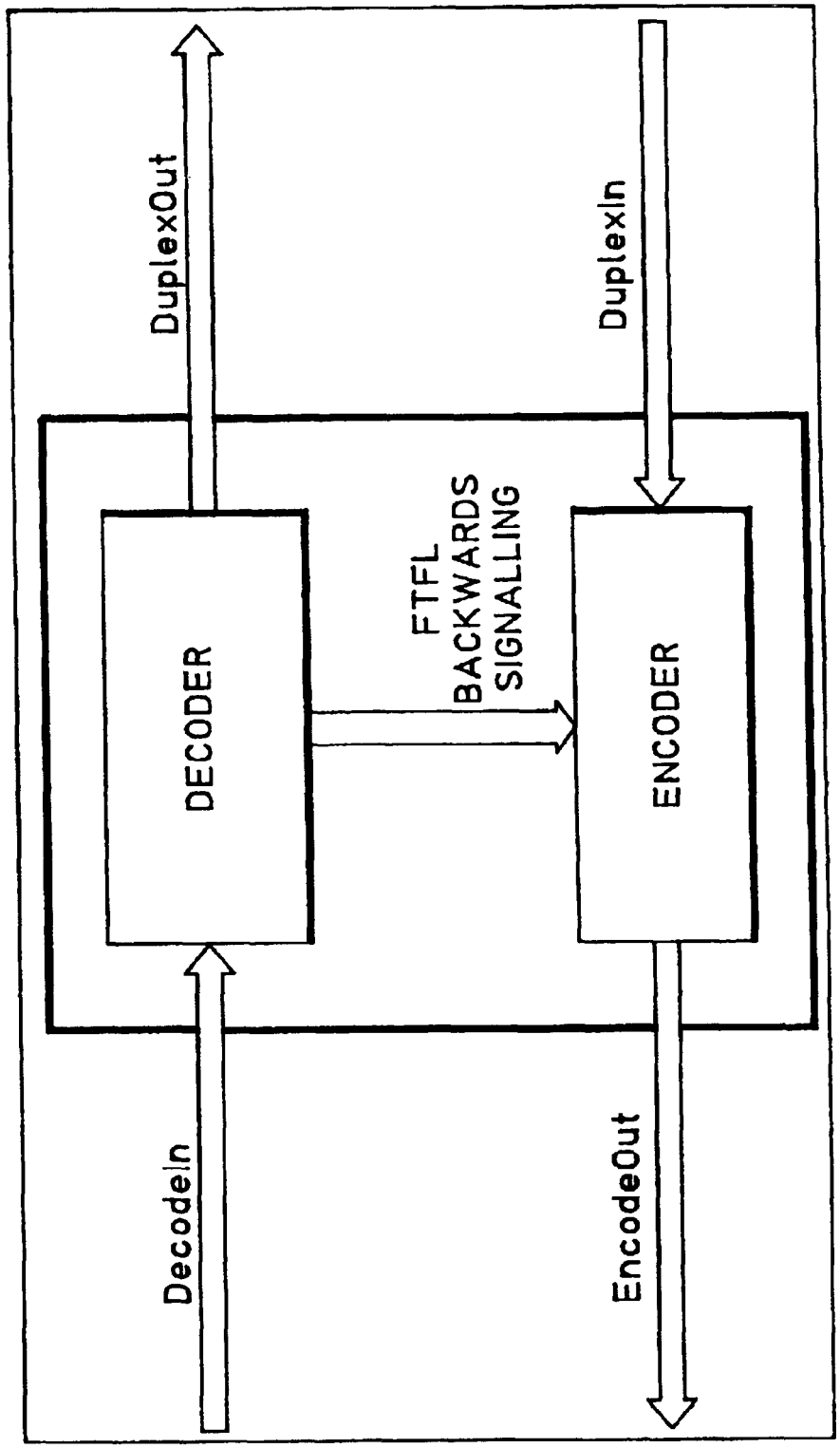
FIG. 1 is a schematic block diagram of a full-duplex processing node (prior art).
Figure 2A:
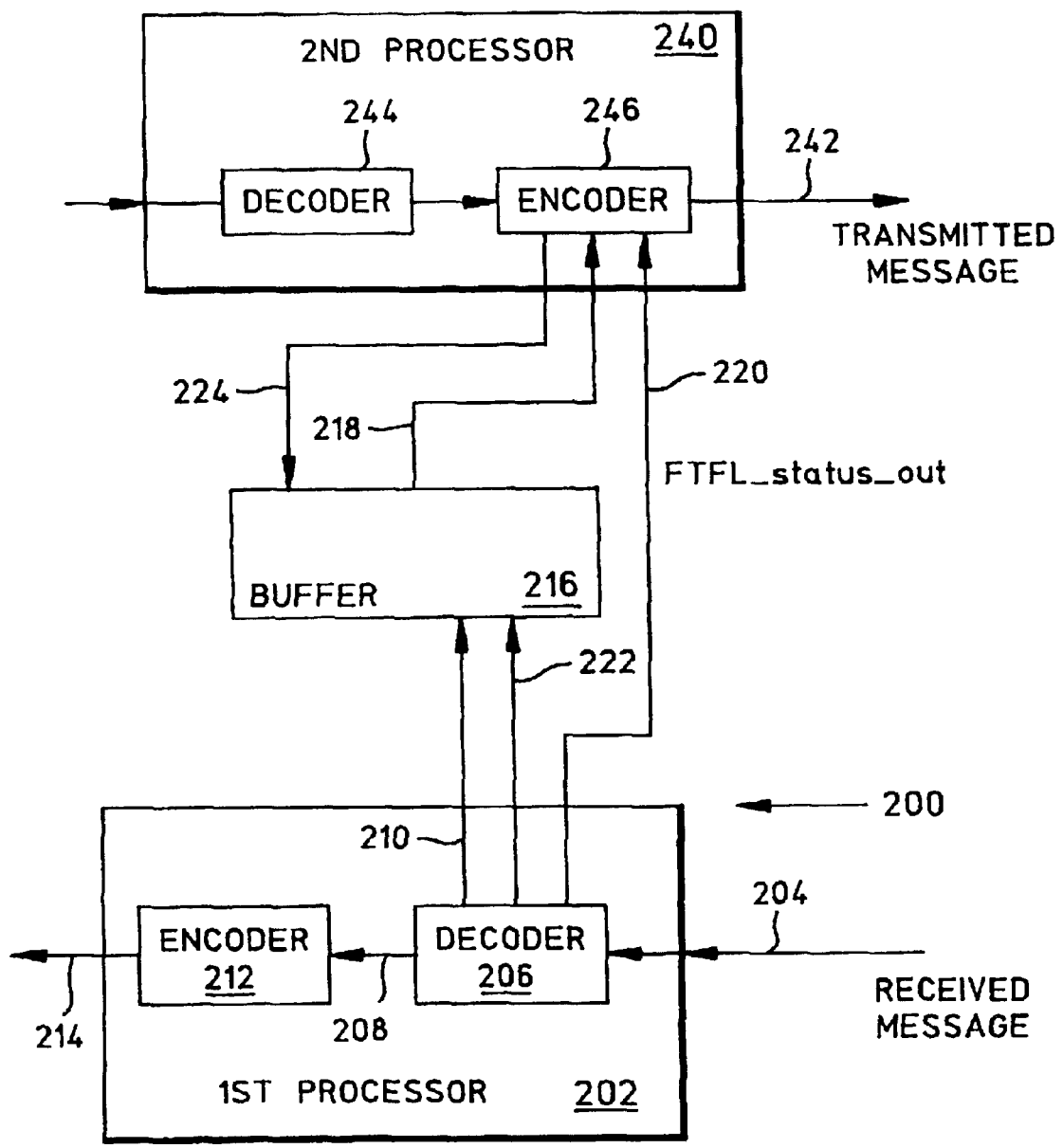
FIGS. 2a and 2b are schematic block diagrams of systems for transporting fault type and fault location (FTFL) messages in a G.709 network.
Figure 2B:
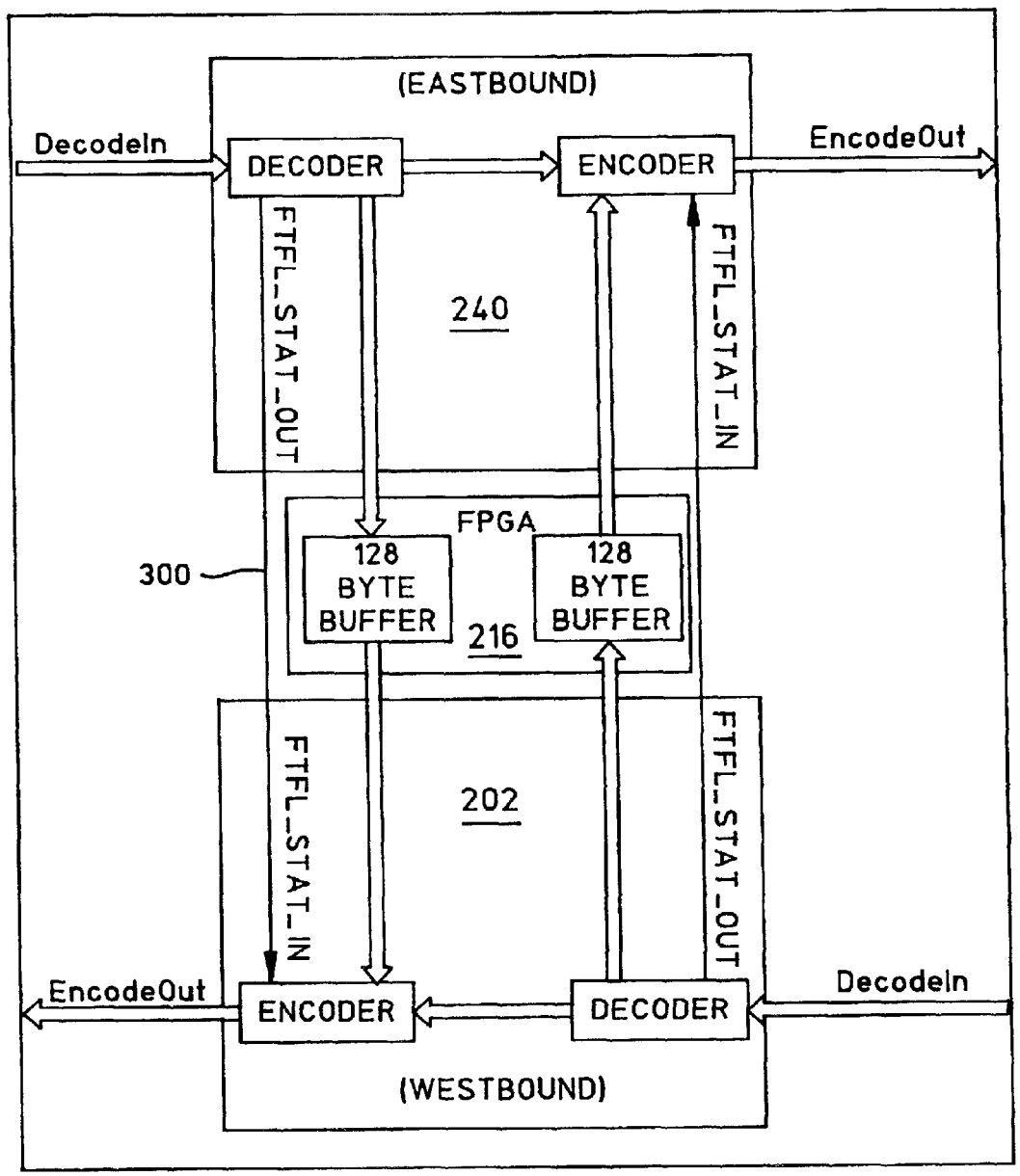

FIGS. 2a and 2b are schematic block diagrams of systems for transporting fault type and fault location (FTFL) messages in a G.709 network. In FIG. 2a, the system 200 comprises a simplex processor 202 having an input on line 204 for receiving messages in a digital wrapper frame format with overhead bytes in every frame. Typically, the simplex processor 202, which is also referred to herein as a simplex device, is an integrated circuit (IC). The processor 202 recovers FTFL information from the received message overhead bytes. A decoder 206 accepts the received messages and provides decoded messages on line 208. The simplex processor supplies modified FTFL overhead bytes on line 210. Typically, messages are encoded again, with either the same, or a modified overhead section, using encoder 212, and the encoded message is supplied on line 214.

Figure 3A:
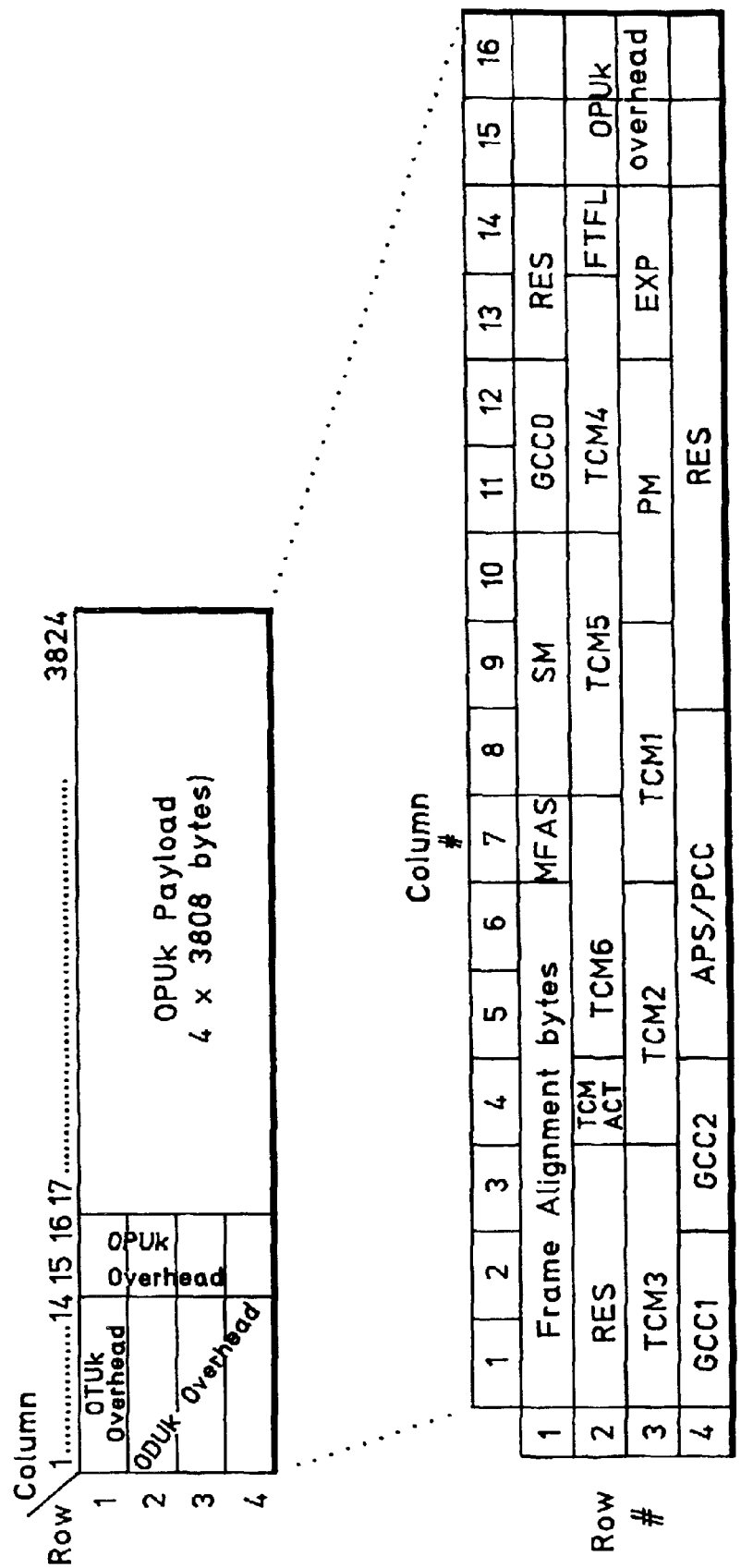
FIGS. 3A and 3B are diagrams illustrating the G.709 optical channel transport unit (OTU) frame structure.
Figure 3B:
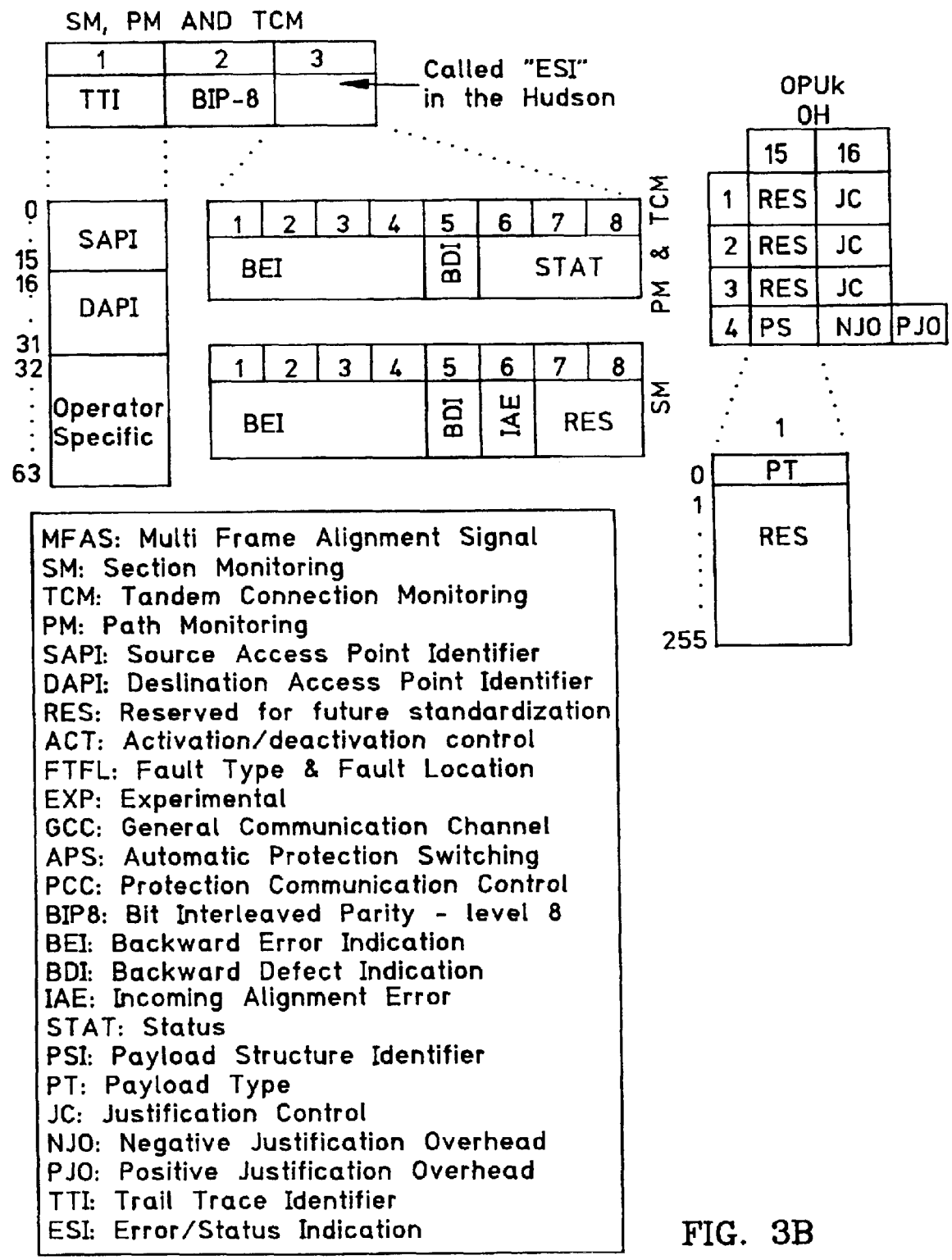

FIGS. 3A and 3B are diagrams illustrating the G.709 optical channel transport unit (OTU) frame structure. The received FTFL bytes are collected in the receiving processor and are used only to generate performance monitoring statistics within that integrated circuit. In a G.709 compliant system, it is normal to provide read access to all 64 of the G.709 overhead bytes to a user interface during each frame. One of these 64 overhead bytes is the FTFL byte for that frame. The FTFL byte is shown in row 2, column 14 of the frame.

As mentioned above, the simplex processor recovers a full FTFL message that includes 128 forward message bytes and 128 backward messages bytes. These FTFL bytes are collected, one byte every frame, over the course of 256 frames. It should be understood that the present invention is not limited to any particular frame or superframe structure.

Instead of providing the unneeded received FTFL bytes, the receiving simple processor provides read access to the calculated FTFL bytes instead by overwriting the received FTFL bytes with the calculated FTFL bytes that should be sent upstream. However, because the error condition is not always present that requires the backwards FTFL message to be sent, an additional signal is needed to indicate when the message is present. Thus, this invention defines a signal that is used to identify when the message is present. Then, a simple circuit such as a field programmable gate array is used to transfer these FTFL bytes from one simplex processor to another.

Returning to FIG. 2a, a buffer 216 is shown having an input connected to line 210 to receive FTFL bytes and an output on line 218 to selectively supply modified FTFL information for transmit message overhead bytes. The buffer 216 can be any register or memory device capable of storing a complete FTFL backward message. For example, the buffer 216 can be a field programmable gate array (FPGA). The transmit message is ultimately sent to the device or node supplying the received message (not shown) on line 204.

The simplex processor 202 examines the received messages on line 204 to determine errors, generates a backward message to report the determined errors, and overwrites the received backward message with the generated backward message to create modified FTFL information supplied at the output on line 210. Thus, the 128 byte backward message is modified in response to the determined errors. When there are no errors to report, the simplex processor 202 maintains the received backward message. The term "maintains" as used herein is understood to mean that no modified backward message is written to the buffer 216. Note that when the backward message is not modified, there is no reason to change the FTFL backward message portion of the transmit message. In some aspects of the system 200, the backwards message can be dropped into the buffer 216, even if it is not modified. Alternately, the transmit message can be sent with a default FTFL backwards message.

The simplex processor 202 also has an output connected to line 220 for sending a FTFL_status_out signal. This signal is sent in response to overwriting the received backward message with the generated backward message in the buffer 216. The system 200 is enabled because the buffer 216 supplies the modified FTFL information in response to the FTFL_status_out signal on line 220.

The simplex processor 202 also has an output to supply write timing signals on line 222. The simplex processor 202 drops the overhead bytes from the received message on line 204, replaces the received FTFL information with the modified FTFL information, and writes modified FTFL information into the buffer 216 using the write timing signals. Once the modified FTFL information has been buffered, the simplex processor 202 sends the FTFL_status_out signal on line 220. The buffer 216 supplies the modified FTFL information for reading into the transmit message overhead bytes on line 218 using read timing signals on line 224 responsive to the transmit messages. The receive message timing is likely to be different than the transmit message timing.

In some aspects of the system 200, the buffer 216 supplies one FTFL byte per transmit frame. That is, the buffer receives one read timing signal on line 224 per transmit frame and supplies 1 FTFL byte in response. Alternately, the buffer 216 can supplies the 128-byte backward message in one transmit frame. That is, the buffer can supply the 128 byte backward message in the span of one transmit frame (or one clock cycle) in response to a single read timing signal on line 224.

The system 200 is perhaps better appreciated in the context of a G.709 network of connected simplex devices. Then, a second simplex processor 240 must be introduced. The second simplex processor 240 has an input connected to the buffer output on line 218, and an output on line 242 for supplying transmit message overhead bytes with the modified FTFL information. Again the second processor 240 typically includes a decoder 244 and an encoder 246. The second simplex processor 240 has an input on line 220 to accept the FTFL_status_out signal. The second simplex processor reads the modified FTFL information from the buffer 216 on line 218 in response to receiving the FTFL_status_out signal on line 220. Also, the second simplex processor 240 has an output to supply read timing signals on line 224. The second simplex processor 240 reads the modified FTFL information from the buffer 216 using the read timing signals on line 224.

It should be understood that the combination of the buffer 216, with the FTFL_status_out signal on line 220, permits the FTFL information to be passed between devices that are not necessarily operating with the same clock. It should also be realized that the present invention means for transferring the FTFL information permits the interface between devices to be the simplest form of buffer.

FIG. 2b is a schematic block diagram illustrating a G.709 network where the buffer 216 (or two buffers) is used to additionally transport FTFL backward messages from the second simplex processor 240 to the first simplex process 202. The second simplex processor supplies modified backward message bytes to the buffer 216 and uses a FTFL_status_out signal on line 300 to indicate when the buffer is ready.

There is no requirement for a fixed timing relationship between the FTFL information being received on line 204 and the modified FTFL information that is transmitted on line 242. The buffer 216 and the FTFL_status_out signals permit the buffer to be loaded at the pace of the first simplex device 202 and unloaded at the pace needed to support the second simplex device 240. The two simplex devices need not be synchronized for the present invention FTFL function.

Figure 4:
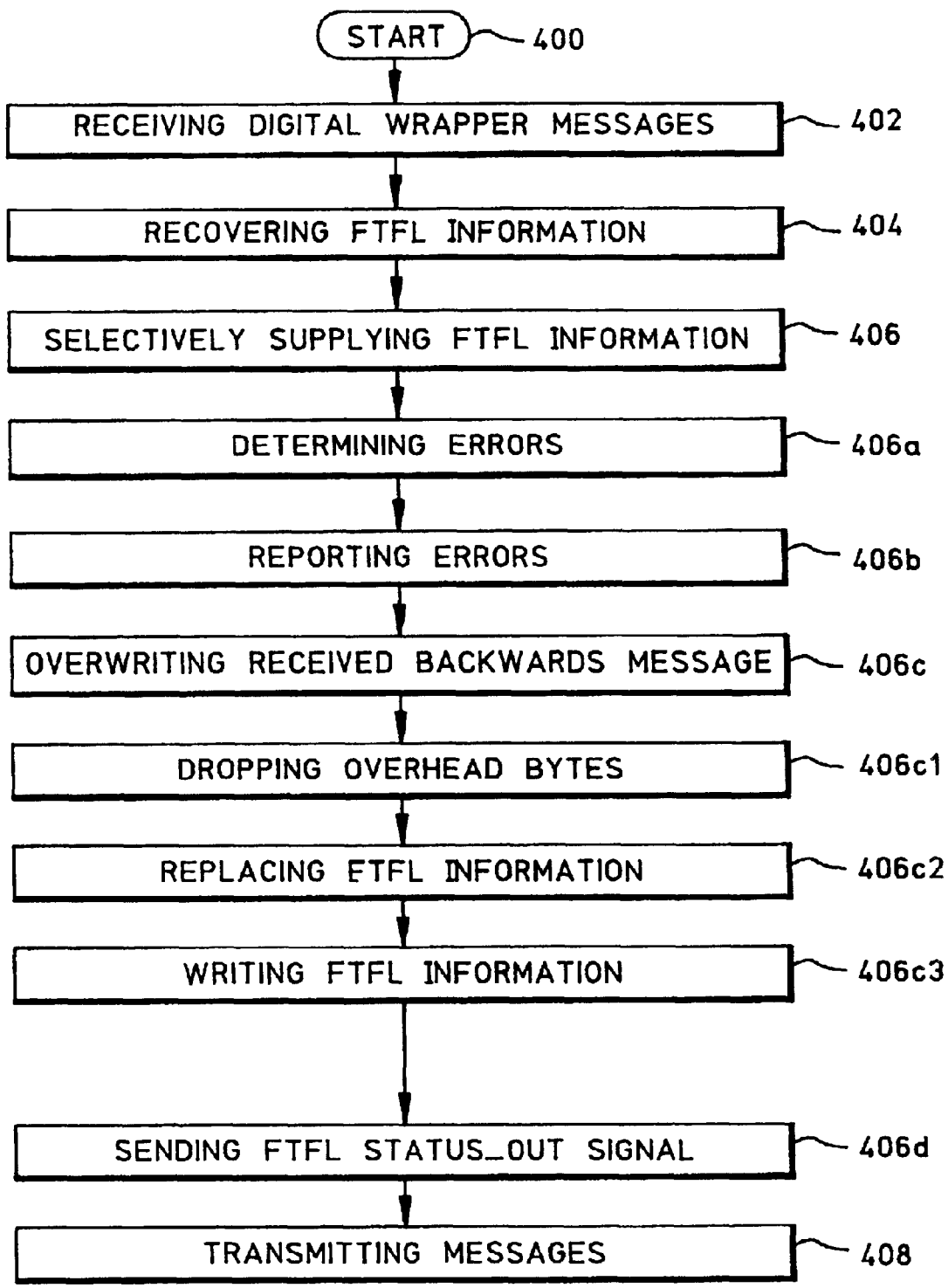
FIG. 4 is a flowchart illustrating the present invention method for transporting fault type and fault location (FTFL) messages in a G.709 network-connected simplex device.

FIG. 4 is a flowchart illustrating the present invention method for transporting fault type and fault location (FTFL) messages in a G.709 network-connected simplex device. Although the method (and the method of FIG. 5 below) is depicted as a sequence of numbered steps for clarity, no ordering should be inferred from the numbering unless explicitly stated. The method begins at Step 400. Step 402 receives messages from a first source in a digital wrapper frame format with overhead bytes in every frame. Step 404 recovers FTFL information from the received message overhead bytes. Step 406 selectively supplies modified FTFL information for transmit message overhead bytes to the first source.

Recovering FTFL information from the received message overhead bytes in Step 404 includes recovering a 256 byte FTFL message, including a 128-byte forward message and a 128-byte backward message.

In some aspects of the method, selectively supplying modified FTFL information for transmit message overhead bytes to the first source includes substeps. Step 406*a* examines the received messages to determine errors. Step 406*b* generates a backward message to report the determined errors. Step 406*c* overwrites the received backward message with the generated backward message to create the modified FTFL information. Further, selectively supplying modified FTFL information for transmit message overhead bytes to the first source includes maintaining (as defined above) the received backward message when there are no errors to report.

In some aspects, selectively supplying modified FTFL information for transmit message overhead bytes to the first source includes a further substep. In response to overwriting the received backward message with the generated backward message in Step 406*c*, Step 406*d* sends a FTFL_status_out signal. Then, Step 408 transmits messages to the first source with the modified FTFL information in response to the FTFL_status_out signal.

Overwriting the received backward message with the generated backward message to create modified FTFL information includes substeps. Step 406*c*1 drops the overhead bytes in the received message. Step 406*c*2 replaces the received FTFL information with the modified FTFL information. Step 406*c*3 writes a buffer with the modified FTFL information using write timing signals responsive to the received messages. Sending the FTFL_status_out signal in Step 406*d* includes sending the FTFL_status_out signal when the modified FTFL information has been buffered. Then, transmitting messages to the first source with the modified FTFL information in response to the FTFL_status_out signal in Step 408 includes reading the modified FTFL information from the buffer into transmit message using read timing signals responsive to the transmit messages.

In some aspects of the method, reading the modified FTFL information from the buffer into the transmit messages using read timing signals responsive to the transmit messages in Step 406*c*4 includes reading the entire 128-byte backward message in response to a one read timing signal. Alternately, Step 406*c*4 reads one FTFL byte per transmit frame (one FTFL byte per read timing signal).

Figure 5:
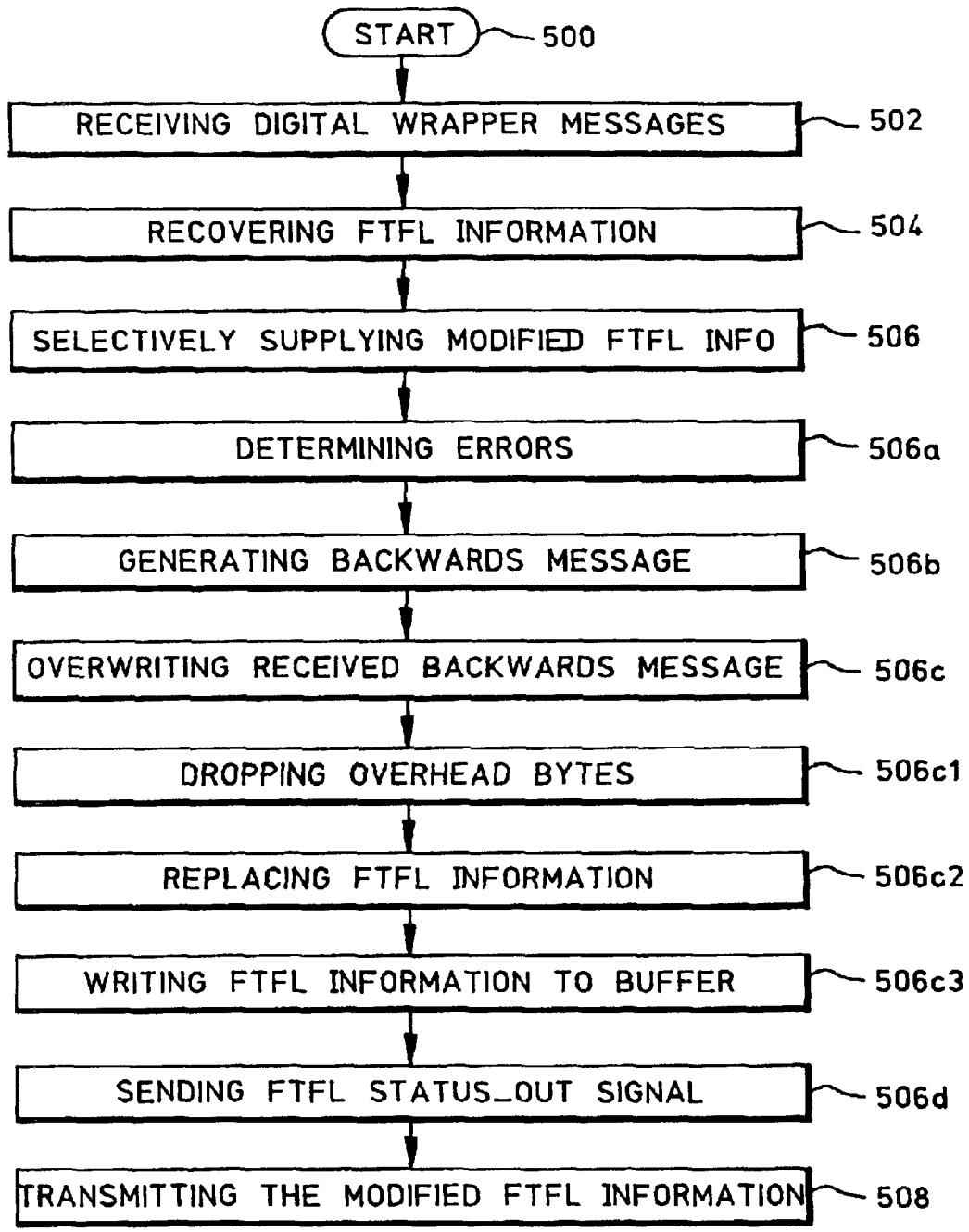
FIG. 5 is a flowchart illustrating the present invention method for transporting fault type and fault location (FTFL) messages in a G.709 network of connected simplex devices.

FIG. 5 is a flowchart illustrating the present invention method for transporting fault type and fault location (FTFL) messages in a G.709 network of connected simplex devices. The method starts at Step 500. Step 502 receives messages at a first simplex device in a digital wrapper frame format with overhead bytes in every frame. Step 504 recovers FTFL information from the received message overhead bytes. Step 506 selectively supplies modified FTFL information. Step 508 transmits the modified FTFL information in message overhead bytes using a second simplex device.

Recovering FTFL information from the received message overhead bytes in Step 504 includes recovering a 256 byte message, including a 128-byte forward message and a 128-byte backward message.

Selectively supplying modified FTFL information in Step 506 includes substeps. Step 506*a* examines the received messages to determine errors. Step 506*b* generates a backward message to report the determined errors. Step 506*c* overwrites the received backward message with the generated backward message to create the modified FTFL message.

In some aspects of the method, reading the modified FTFL information from the buffer into the transmit messages using read timing signals responsive to the transmit messages in Step 408 includes reading the entire 128-byte backward message in response to a one read timing signal. Alternately, Step 408 reads one FTFL byte per transmit frame (one FTFL byte per read timing signal).

However, selectively supplying modified FTFL information can also include the first simplex device maintaining the received backward message when there are no errors to report.

Overwriting the received backward message with the generated backward message to create the modified FTFL message includes further substeps. Step 506*c*1 drops the overhead bytes in the received message. Step 506*c*2 replaces the received FTFL information with the modified FTFL information. Step 506*c*3 writes a buffer with the modified FTFL message using first simplex device read timing signals. Sending the FTFL_status_out signal in Step 506*d* includes the first simplex device sending the FTFL_status_out signal when the modified FTFL message has been buffered. Then, transmitting the modified FTFL information in message overhead bytes using a second simplex device in Step 508 includes reading the modified FTFL message from the buffer using second simplex device read timing signals.

In some aspects of the method, reading the modified FTFL information from the buffer using second simplex device read timing signals in Step 508 includes reading one FTFL byte per transmit message frame (one FTFL byte per read signal). Alternately, the entire 128-byte backward message is read in one transmit frame (128 bytes per read signal).

In some aspects, receiving messages at a first simplex device in a digital wrapper frame format with overhead bytes in every frame in Step 502 include receiving messages from a third device. Transmitting the modified FTFL information in message overhead bytes using a second simplex device in Step 508 includes transmitting to the third device.

A system and method has been provided for transporting FTFL information between simplex processors. Although examples have been given for a G.709 system, the present invention is applicable to a broader range of digital wrapper formats. Other variations and embodiments of the invention will occur to those skilled in the art.

We claim:

1. In a G.709 network-connected simplex device, a method for transporting fault type and fault location (FTFL) messages, the method comprising:

receiving messages from a first source in a digital wrapper frame format with overhead bytes in every frame;

recovering FTFL information from the received message overhead bytes; and, selectively supplying modified FTFL information for transmit message overhead bytes to the first source.

2. The method of claim 1 wherein recovering FTFL information from the received message overhead bytes includes recovering a 256 byte FTFL message, including a 128-byte forward message and a 128-byte backward message.

3. The method of claim 2 wherein selectively supplying modified FTFL information for transmit message overhead bytes to the first source includes:

examining the received messages to determine errors;

generating a backward message to report the determined errors; and, overwriting the received backward message with the generated backward message to create the modified FTFL information.

4. The method of claim 3 wherein selectively supplying modified FTFL information for transmit message overhead bytes to the first source includes maintaining the received backward message when there are no errors to report.

5. The method of claim 3 wherein selectively supplying modified FTFL information for transmit message overhead bytes to the first source, in response to overwriting the received backward message with the generated backward message, includes sending a FTFL_status_out signal; and, the method further comprising:

transmitting messages to the first source with the modified FTFL information in response to the FTFL_status_out signal.

6. The method of claim 5 wherein overwriting the received backward message with the generated backward message to create modified FTFL information includes:

dropping the overhead bytes from the received message;

replacing the received FTFL information with the modified FTFL information;

writing a buffer with the modified FTFL information using write timing signals responsive to the received messages;

wherein sending a FTFL_status_out signal includes sending the FTFL_status_out signal when the modified FTFL information has been buffered; and, wherein transmitting messages to the first source with the modified FTFL information in response to the FTFL_status_out signal includes reading the modified FTFL information from the buffer into transmit message using read timing signals responsive to the transmit messages.

7. The method of claim 6 wherein reading the modified FTFL information from the buffer into the transmit messages using read timing signals responsive to the transmit messages includes reading the entire 128-byte backward message in response to a one read timing signal.

8. The method of claim 6 wherein reading the modified FTFL information from the buffer into the transmit messages using read timing signals responsive to the transmit messages includes reading one FTFL byte per transmit frame.

9. In a G.709 network of connected simplex devices, a method for transporting fault type and fault location (FTFL) messages, the method comprising:

receiving messages at a first simplex device in a digital wrapper frame format with overhead bytes in every frame;

recovering FTFL information from the received message overhead bytes;

selectively supplying modified FTFL information; and, transmitting the modified FTFL information in message overhead bytes using a second simplex device.

10. The method of claim 9 wherein recovering FTFL information from the received message overhead bytes includes recovering a 256 byte message, including a 128-byte forward message and a 128-byte backward message.

11. The method of claim 10 wherein selectively supplying modified FTFL information includes:

examining the received messages to determine errors;

generating a backward message to report the determined errors; and, overwriting the received backward message with the generated backward message to create the modified FTFL message.

12. The method of claim 11 wherein selectively supplying modified FTFL information includes the first simplex device maintaining the received backward message when there are no errors to report.

13. The method of claim 11 wherein selectively supplying modified FTFL information, in response to overwriting the received backward message with the generated backward message, includes sending a FTFL_status_out signal from the first simplex device to the second simplex device; and, wherein transmitting the modified FTFL information in message overhead bytes using a second simplex device includes transmitting the modified FTFL information in response to the FTFL_status_out signal.

14. The method of claim 13 wherein overwriting the received backward message with the generated backward message to create the modified FTFL message includes the first simplex device:

dropping the overhead bytes in the received message;

replacing the received FTFL information with the modified FTFL information;

writing a buffer with the modified FTFL message using first simplex device write timing signals;

wherein sending the FTFL_status_out signal includes sending the FTFL_status_out signal when the modified FTFL message has been buffered; and, wherein transmitting the modified FTFL information in message overhead bytes using a second simplex device includes reading the modified FTFL message from the buffer using second simplex device read timing signals.

15. The method of claim 14 wherein reading the modified FTFL information from the buffer using second simplex device read timing signals includes reading one FTFL byte per transmit message frame.

16. The method of claim 14 wherein reading the modified FTFL information from the buffer using second simplex device read timing signals includes reading the 128-byte backward message in one transmit frame.

17. The method of claim 9 wherein receiving messages at a first simplex device in a digital wrapper frame format with overhead bytes in every frame include receiving messages from a third device; and, wherein transmitting the modified FTFL information in message overhead bytes using a second simplex device includes transmitting to the third device.

18. In a G.709 network, a system for transporting fault type and fault location (FTFL) messages, the system comprising:

a simplex processor having an input for receiving messages in a digital wrapper frame format with overhead bytes in every frame and recovering FTFL information from the received message overhead bytes; and, a buffer having an output to selectively supply modified FTFL information for transmit message overhead bytes.

19. The system of claim 18 wherein simplex processor recovers a 256 byte message from the overhead bytes, including a 128-byte forward message and a 128-byte backward message.

20. The system of claim 19 wherein the simplex processor examines the received messages to determine errors, generates a backward message to report the determined errors, and overwrites the received backward message with the generated backward message to create modified FTFL information supplied at an output; and, wherein the buffer has an input to accept the modified FTFL information from the simplex processor.

21. The system of claim 20 wherein the simplex processor maintains the received backward message when there are no errors to report.

22. The system of claim 20 wherein the simplex processor has an output for sending a FTFL_status_out signal in response to overwriting the received backward message with the generated backward message; and, wherein the buffer supplies the modified FTFL information in response to the FTFL_status_out signal.

23. The system of claim 22 wherein the simplex processor having an output to supply write timing signals, the simplex processor dropping overhead bytes from the received message, replacing the received FTFL information with the modified FTFL information, writing modified FTFL information into the buffer using write timing signals, and sending the FTFL_status_out signal when the modified FTFL information has been buffered; and, wherein the buffer supplies the modified FTFL information for reading into the transmit message overhead bytes using read timing signals responsive to the transmit messages.

24. The system of claim 23 wherein the buffer supplies one FTFL byte per transmit frame.

25. The system of claim 23 wherein the buffer supplies the 128-byte backward message in response to one read timing signal.

26. In a G.709 network, a system for transporting fault type and fault location (FTFL) messages, the system comprising:

a first simplex processor having an input for receiving messages in a digital wrapper frame format with overhead bytes in every frame and recovering FTFL information from the received message overhead bytes;

a buffer having an output to supply modified FTFL information; and, a second simplex processor having an input connected to the buffer output, and an output for supplying transmit message overhead bytes with the modified FTFL information.

27. The system of claim 26 wherein the first simplex processor recovers a 256 byte message from the overhead bytes, including a 128-byte forward message and a 128-byte backward message.

28. The system of claim 27 wherein the first simplex processor examines the received messages to determine errors, generates a backward message to report the determined errors, and overwrites the received backward message with the generated backward message to create modified FTFL information supplied at an output; and, wherein the buffer has an input to accept the modified FTFL information.

29. The system of claim 28 wherein the first simplex processor maintains the received backward message when there are no errors to report.

30. The system of claim 28 wherein the first simplex processor has an output for sending a FTFL_status_out signal in response to overwriting the received backward message with the generated backward message and buffering the modified FTFL information; and, wherein the second simplex processor has an input to accept the FTFL_status_out signal and reads the modified FTFL information from the buffer in response to receiving the FTFL_status_out signal.

31. The system of claim 30 wherein the first simplex processor has an output to supply write timing signals, the first simplex processor dropping the overhead bytes from the received message, replacing the received FTFL information with the modified FTFL information, and writing modified FTFL information to the buffer using the write timing signals;

wherein the buffer has an input to receive write timing signals from the first simplex processor for writing FTFL information and an input to accept read timing signals from the second simplex processor; and, wherein the second simplex processor has an output to supply read timing signals to the buffer, and wherein the second simplex processor reads the modified FTFL information from the buffer using the read timing signals.

32. The system of claim 31 wherein the second simplex processor sends one read timing signal per transmit frame; and, wherein the buffer supplies one FTFL byte per frame in response to read timing signals from the second simplex processor.

33. The system of claim 31 wherein the second simplex processor sends one read timing signal for every 256 transmit frames; and, wherein the buffer supplies the 128-byte backward message in response to one second simplex processor read timing signal.

* * * * *